United States Patent [19]
O'Brien, Jr.

[11] 3,859,015
[45] Jan. 7, 1975

[54] SHAPING DETECTOR FOR TIRE MOLD

[76] Inventor: John A. O'Brien, Jr., 2807 Central Ave., Birmingham, Ala. 35209

[22] Filed: Oct. 13, 1972

[21] Appl. No.: 297,197

[52] U.S. Cl. ............... 425/29, 425/138, 425/150, 425/151
[51] Int. Cl. ..................... B29h 5/02, B29h 5/08
[58] Field of Search ............ 425/29, 138, 150, 151, 425/163

[56] References Cited
UNITED STATES PATENTS

| | | | |
|---|---|---|---|
| 3,067,466 | 12/1962 | Smith et al. | 425/29 |
| 3,222,724 | 12/1965 | Soderquist | 425/29 |
| 3,461,502 | 8/1969 | Turk et al. | 425/29 |

Primary Examiner—J. Howard Flint, Jr.
Attorney, Agent, or Firm—Michael, Best & Friedrich

[57] ABSTRACT

At least one fluidic proximity sensor is movable selectively to an outer position outwardly of a tire mold cavity and to a predetermined inner position within the cavity and is actuated in response to outward movement of the tire to a predetermined location relative to the sensor. The sensor is moved to said inner position upon introduction of final shaping media and control means operatively connects the sensor to a control valve to interrupt the supply of shaping media upon movement of the tire to said predetermined location whereupon the sensor is moved to said outer position permitting mold closure.

9 Claims, 7 Drawing Figures

SHAPING DETECTOR FOR TIRE MOLD

BACKGROUND OF THE INVENTION

This invention relates to a shaping detector for a tire mold and more particularly to apparatus for properly shaping the green tire prior to mold closure whereby under shaping and over shaping is eliminated.

As is well known in the art of producing tires, a green tire is built up through various procedures of laminating, belting and the like. The green tire is loaded into the mold cavity of the press and is placed over a bladder which subsequently is inflated with a shaping media, such as steam. Upon completion of the shaping cycle, the press closes and the curing cycle begins whereby the tire receives its shape, tread design and cure. Usually this is accomplished in a twin cavity press or a dual mold press.

If the green tire is over shaped, too large, the mold closure can cause a pinching action on the tire or it can actually cause a thin section to form on the circumference of the tire in the middle of the tread. Either condition results in the production of a reject or second. On the other hand, should the tire be under shaped, too small, the introduction of high pressure steam after mold closure causes a rapid, almost explosive, expansion of the tire into the mold. When such rapid expansion occurs the tire seldom expands uniformly, thus resulting in differences in thickness from one section of the tire to another. This is a major cause of so-called "lumpy" tires which results in the production of total rejects, seconds, or acceptable but poor quality tires.

With prior art shaping control devices, the tire mold often closes before green tires have achieved their correct size due to the fact that such devices require monitoring of precision regulators and timers in the shaping cycle whereby the mold often closes on a slack or undershaped tire. Accordingly, unmatched bladders may not be used with equal effectiveness.

BRIEF SUMMARY OF THE INVENTION

In accordance with my invention, I provide at least one fluidic proximity sensor which is movable selectively to an outer position outwardly of a tire mold cavity and to a predetermined inner position within the cavity. The sensor is actuated in response to outward movement of the tire to a predetermined location relative to the sensor. Upon introduction of final shaping media the fluidic sensor is projected into the open mold cavity to a precise location. The sensor or sensors, as the case may be, are operatively connected to a fluidic control system which controls valves that supply shaping media to the bladders. Each green tire expands until it triggers its fluidic sensor. At no time does the sensor come in contact with the tire since triggering occurs when the tire is approximately one-half inch from the sensor. The resulting signal from the sensor is fed back into the fluidic system where logic sequences occur to produce a signal in a memory bank indicating correct shape in that particular cavity and the immediate shutting off of shaping steam thereto. When the tire in the remaining cavity finally triggers its sensor the fluidic logic causes the shaping media to be blocked to both cavities while simultaneously causing the sensors to be withdrawn from the mold cavity.

At the time the sensors are projected into the mold cavity, an adjustable, pneumatic timer is also energized. Should the sensors not be retracted within a predetermined interval of time, the timer will open and thus issue an appropriate warning signal which indicates the presence of a malfunction that has prevented either or both tires from achieving correct size. Malfunctions of this sort could be leaking bladders, center post leakage, regulator failure and the like. In accordance with my invention, I eliminate the requirement for and monitoring of precision regulators and timers in the shaping cycle due to the fact that my apparatus measures the actual physical size of each tire and does not depend on a correlation of pressure and time. Accordingly, unmatched bladders may be used with equal effectiveness since each tire is measured and controlled independently of the other. Bladder life will be determined by its own burst rather than the burst of the weaker of the two. Should it be desired to operate one cavity and not the other, a suitable switch is thrown and a steam valve is closed whereby either cavity can be operated independently of the other. This would apply to intentional single cavity production or in the event of one bladder failure or other malfunction.

DESCRIPTION OF THE DRAWINGS

Referring now to the drawings for a better understanding of my invention, I show in FIG. 1 proximity, fluidic sensors 10 and 11 mounted on the piston rods of fluid pressure operated cylinders 12 and 13, respectively. The sensors 10 and 11 are of a conventional type which utilized compressed air, or gas, to generate a signal when an obstruction appears within its range. In actual practice, I have found that a vortex proximity sensor is satisfactory in every respect. Such a sensor is sold by and described in catalogs published by Bowles Fluidics Corporation of Silver Spring, Maryland. However, it will be understood to one skilled in the art that other fluidic sensors may be employed, such as sensors of the reflective type, jet impact, bubble proximity sensors, air stream closure, and the like. In view of the fact that such fluidic sensors are well known in the art, no further description of the various type sensors is deemed necessary. FIGS. 5 and 6 merely show one form of fluidic sensor which may be employed. When the vortex is unobstructed, as shown in FIG. 5, the sensor air flow is in one direction. On the other hand, upon obstructing the vortex, such as occurs when the periphery of the tire 15 approaches the vortex, the sensor air flow is in the opposite direction, as shown. While I show the sensors 10 and 11 as being carried by separate actuator cylinders, it will be apparent that on some presses it would be possible to locate both sensors on a single actuator.

Upon introduction of final shaping media into the mold the usual electrical signal is extracted from the main press control box which stops the motor which closes the mold in a conventional manner. This electrical signal also momentarily energizes a solenoid 14 on a control valve 16 and continuously energizes a solenoid 17 on a control valve 18.

Figure 3:
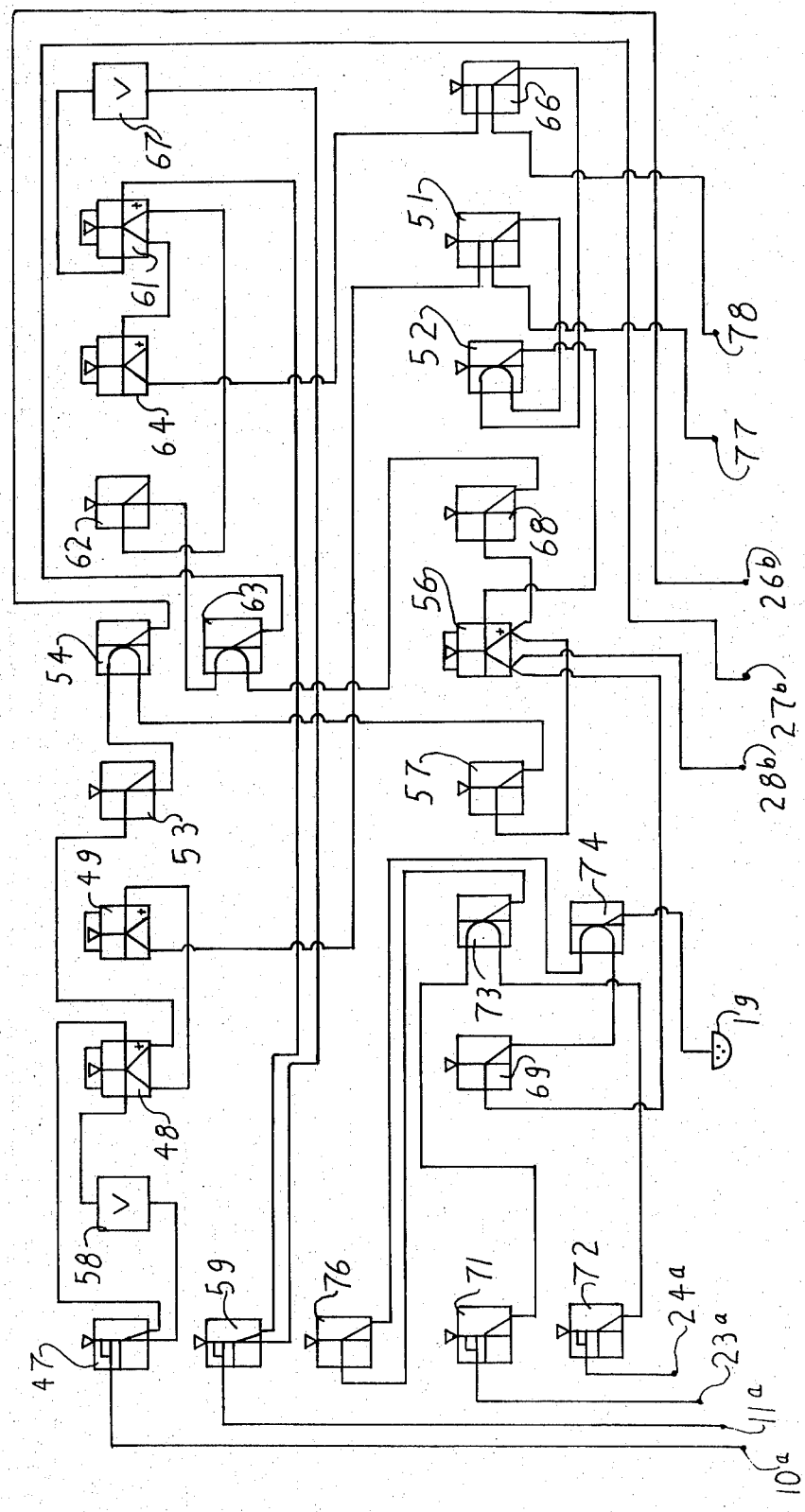
FIG. 3 is a schematic view showing one form of fluidic logic which may be employed.
Figure 6:
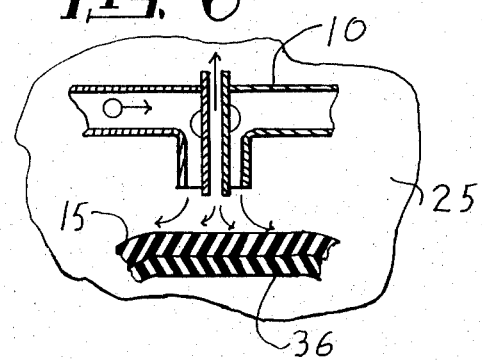
FIG. 6 is a fragmental, sectional view corresponding to FIG. 5 but showing the direction of sensor air flow when the vortex is obstructed; and, FIG. 7 is a schematic view showing another form of fluidic logic in which a single function element is employed in place of the preferential flip-flop elements shown in FIG. 3.

When the mold closure motor, not shown, is stopped it can only be restarted through the actuation of a pressure switch 19, shown in FIG. 3. The control valve 16 is a by-stable four-way valve with a solenoid control pilot operation for one position and a pilot operation only for the other position. Momentary operation of solenoid 14 on valve 16 causes air to be directed through a line 20 and branch lines 20a and 20b to the blank or cap end of the actuator cylinders 12 and 13, respectively, resulting in the projection of the proximity, fluidic sensors 10 and 11 into the mold cavity indicated at 25 in FIG. 6. When this momentary signal ceases to exist the valve 16 remains in the same position. At the time air is directed through the branch lines 20a and 20b to the actuator cylinders 12 and 13, air is also directed to a normally closed pneumatic timer 21 which is of a conventional type.

Figure 4:
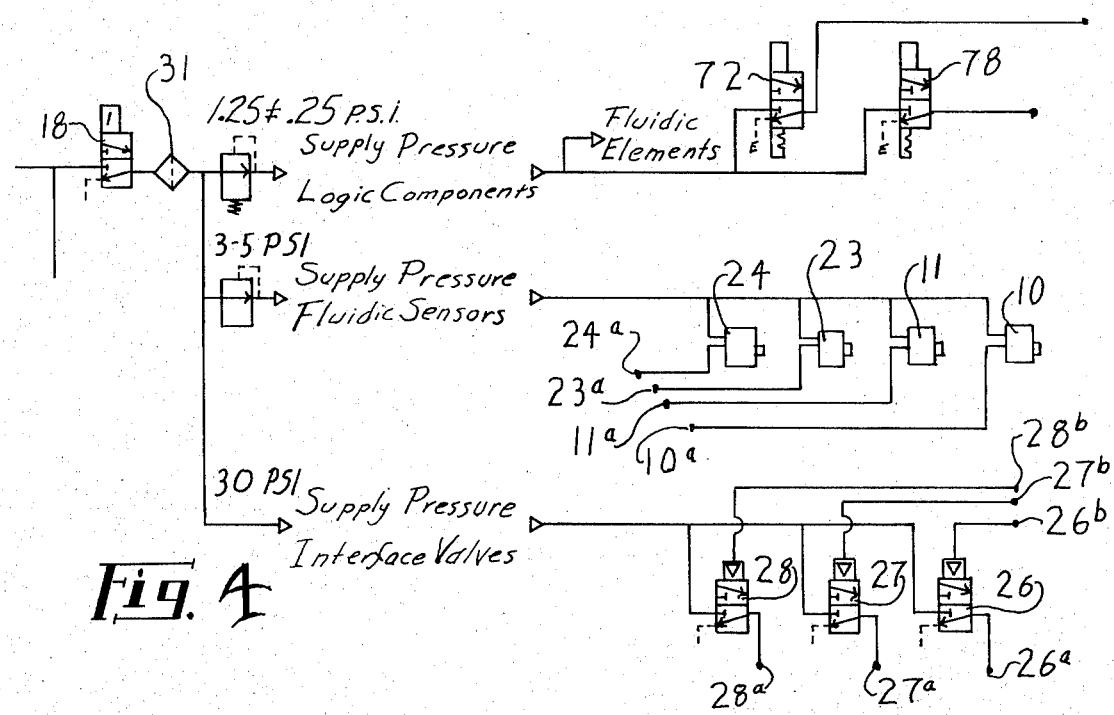
FIG. 4 is a typical input and output element schematic view showing regulation for such elements.
Figure 5:
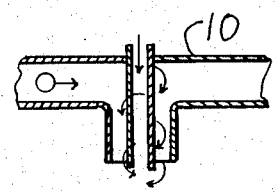
FIG. 5 is an enlarged, fragmental view showing one form of proximity fluidic sensor which may be employed and showing the direction of sensor air flow when the vortex is unobstructed.

Control valve 18 is a normally closed, three-way two position valve and continuous energization of its solenoid 17 permits air to be introduced into a fluidic control box indicated generally at 22. Valve 18 not only activates the fluidic logic elements to be described hereinafter but also furnishes sensing pressure for the fluidic sensors 10 and 11 and other fluidic sensors 23 and 24 which are triggered when sensors 10 and 11 are fully retracted from the mold cavity. It will be apparent to one skilled in the art that any position indicating switch could be substituted for sensors 23 and 24, if desired. Simultaneously valve 18 also applies air pressure to the inlet ports of interface valves 26, 27 and 28 having outlet lines 26a, 27a and 28a, respectively, and pilot lines 26b, 27b and 28b, respectively. Interface valves 26, 27 and 28 are single pilot operated normally closed, three-way valves, as shown in FIG. 4.

Air passing through valve 18 is prefiltered in a conventional manner and immediately passes through a line 29 having a coalescing type filter 31 therein to remove submicronic particles as well as all condensed moisture and oil in both droplet and aerosol form. Air delivered to the interface valves 26, 27 and 28 is at normal line pressure. Air delivered to the fluidic logic elements is reduced to approximately $1.25 \pm 0.25$ PSI while air delivered to the sensors 10, 11, 23 and 24 is reduced such that the inlet pressure at the sensors ranges from approximately 3 to 5 PSI. While the air delivered to valve 16 is at normal plant air pressure, this air should be prefiltered and lubricated.

The shaping media, such as steam, is introduced through a supply line 32 having the existing shaping control valve 30 therein and branch lines 33 and 34 to bladders 36 and 37. As the final shaping media is introduced, the fluidic sensors 10 and 11 are active and in position to be actuated by the tire 15 upon outward movement of the periphery thereof to a predetermined location relative to the sensors 10 and 11. Each tire is caused to expand or grow directly toward its respective sensor 10 or 11, as the case may be, whereby the sensors 10 and 11 extend in a direction perpendicular to the outer surface or tread of the tire.

In the event sensor 10 is triggered first, it will send a signal back to the fluidic control box 22 which among other logic functions results in a pilot signal to interface valve 26. The signal to valve 26 causes air to be directed through line 26a to a shuttle valve 38 to the pilot port of a normally opened steam valve 39 in steam line 33. Upon closing valve 39, the passage of steam through line 33 to the bladder 36 is interrupted. The closing of valve 39 has no effect on steam line 34 to the other bladder 37 which is triggered by sensor 11. In certain conventional presses, it may be desirable to also have the valve 26 output open a small normally closed drain valve.

When the sensor 11 is subsequently triggered its signal to the fluidic box 22 results in the loss of signal to interface valve 26 and a positive signal to interface valve 28. Air passing through valve 28 enters the pilot side of a control valve 41 which causes air to pass through the shuttle valve 38 and a shuttle valve 42 and subsequently to the pilot ports of the steam valve 39 and a steam valve 43 in steam line 34 which blocks incoming steam to both bladders 36 and 37. Simultaneously, air passing through valve 28 also enters the pilot side of control valve 16 causing air to be directed to the rod side of actuator cylinders 12 and 13 whereby the sensors 10 and 11 are retracted from the mold cavity.

Should the tire in the cavity accommodating sensor 10 start to deflate, the signal from sensor 10 would be lost and shaping media would be reintroduced into the bladder 36. There is no limit to the number of times this process could reoccur. The memory signal, however, remains intact as the variations in maintaining or reestablishing the sensor signal will keep the tire size well within acceptable limits.

In the event the reversing signal had not been produced by valve 16 to retract the sensors 10 and 11 before the pneumatic timer 21 had completed its timed delay, timer 21 would open a pneumatic signal to an appropriate warning device, not shown, whereby the operator would be advised of the malfunction.

Upon movement of the sensors 10 and 11 to fully retracted position, they trigger sensors 23 and 24, respectively. The signals from sensors 23 and 24 are sent to the fluidic control box 22 and through various logic steps which result in a signal to pressure switch 19 which permits the mold closure motor to start and simultaneously de-energize the solenoid 17 which deactivates all fluidic components.

Upon closing the mold, a conventional limit switch is actuated which momentarily energizes a solenoid 44 for control valve 41. This vents the pilot ports of steam valves 39 and 43 causing them to open whereby the press is now ready for its normal operation. It will be apparent to one skilled in the art that the steam valves 39 and 43 would have to be added to existing plumbing in a dual cavity piped press.

In the event sensor 11 had been triggered first, it would have resulted in a signal at interface valve 27 with a subsequent signal through shuttle valve 42 into the pilot port of steam valve 43. Subsequent triggering of sensor 10 would cause a loss of signal at interface valve 27 and a positive signal at interface valve 28.

In the event the tire triggering the first signal happens to deflate sufficiently to lose the signal, as described hereinabove, the interface and steam valves on that side would reverse allowing steam to be re-introduced into the bladder with the ultimate re-triggering of the sensor. This procedure could reoccur indefinitely. It will thus be seen that the first signal received from a sensor 10 or 11, as the case may be, is stored in a memory bank and when the second sensor sends its signal through the same memory bank the conditions will be considered satisfied and the withdrawal of the sensors 10 and 11 and closure procedures will be initiated in the usual manner.

Figure 1:
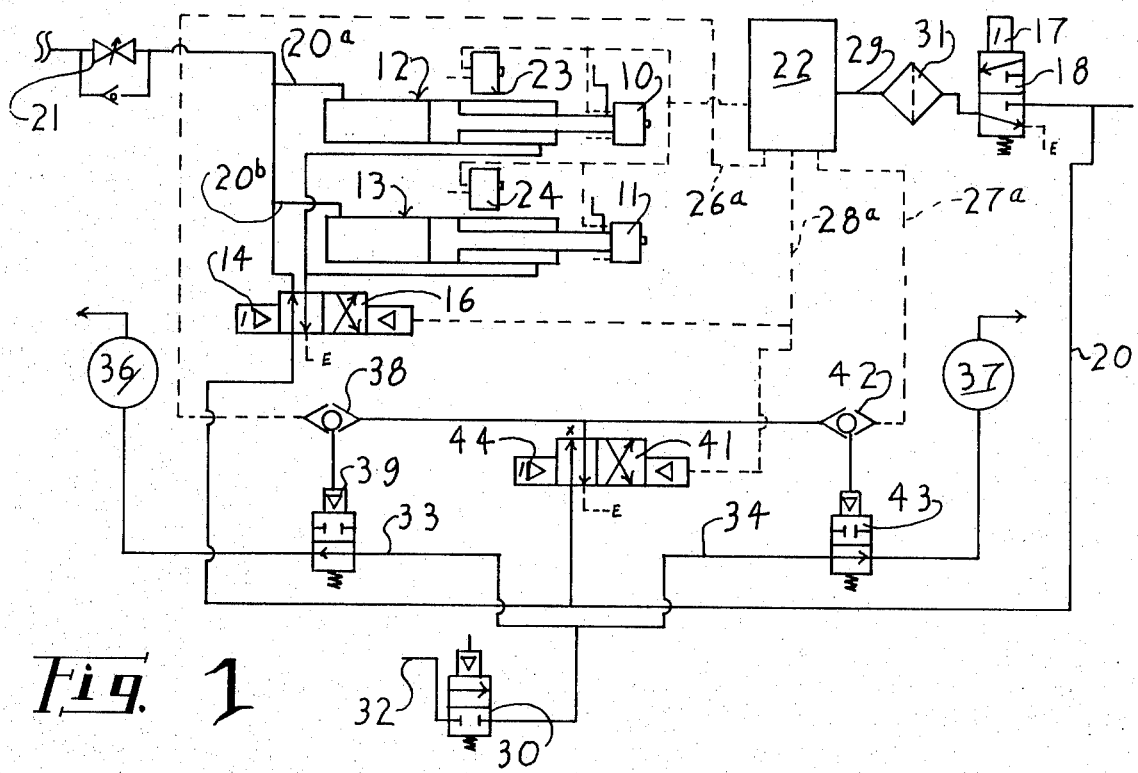
FIG. 1 is a schematic view showing a fluid system, other than fluidic logic, for dual cavity piped presses.
Figure 2:
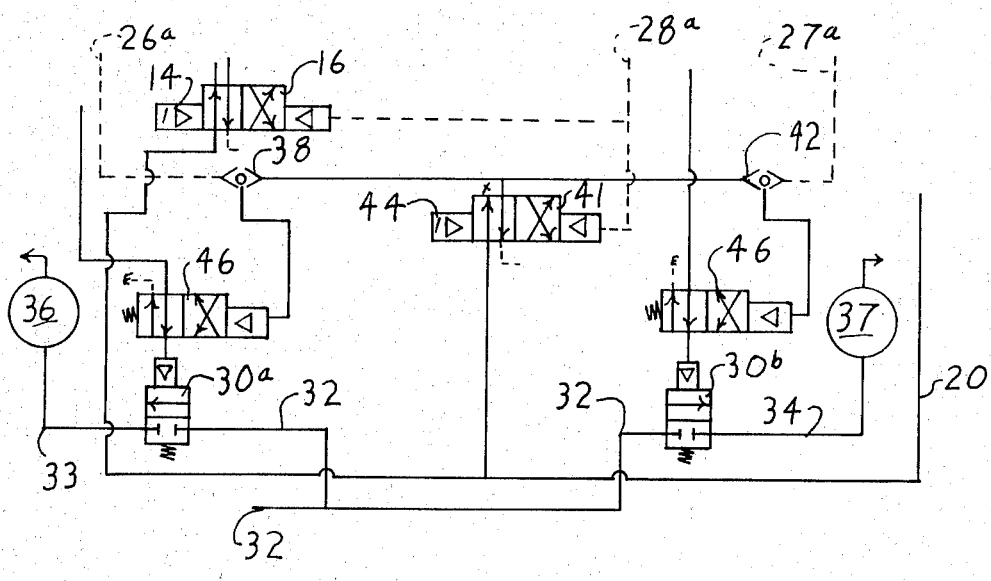
FIG. 2 is a schematic view showing a fluid system, other than fluidic logic, for an individual cavity piped press.

Referring now to FIG. 2 of the drawings, it will be seen that the same basic steps occur for individual cavity pipe presses. In this type press there are, normally installed, normally closed pilot operated steam valves 30a and 30b for each cavity. In this case, a normally opened, two position, pilot operated, spring return air valve 46 is inserted in the pilot line to each steam valve. In normal operations, the normally opened attitude of this pilot valve has no effect on the system. When the appropriate interface valve sends its signal to shut off the steam to a bladder, it merely pilots the air valve which in turn vents the head of the steam valve allowing it to go to its normally closed position.

Referring now to FIG. 3 I show one form of fluidic control system which may be employed. It will be understood that anyone skilled in the art could set up various other schematics to accomplish the same logic. The fluidic sensors could be interfaced immediately with the necessary logic functions being performed electrically, if desired.

In FIG. 3 the signal port for sensors 10, 11, 23 and 24 are indicated at 10a, 11a, 23a and 24a, respectively. When sensor 10 is triggered, it produces an appropriate signal at signal port 10a which closes the key port of element 47, thus shifting its output to the OR side. This results in a signal to the control port of a flip-flop element 48 whereby its output is shifted from the preferential side. This shift in element 48 produces two results. First, it furnishes a signal to the control port of a flip-flop element 49 whereby its output is shifted from the preferential side thus providing a substantial signal to memory elements 51 and 52. Second, the shift in element 48 removes the control signal from OR/NOR element 53 providing a signal at the NOR port which in turn passes to AND element 54. This input to element 54 combines with the signal from PREFERENTIAL FLIP-FLOP element 56 by way of OR/NOR element 57 and results in an output signal which becomes the pilot signal to interface valve pilot 26b.

If the signal from fluidic sensor 10 is lost the output of key element 47 will return to the NOR side thereby returning FLIP-FLOP element 48 to its preferential side. A capacitance element 58 is employed to insure crisp action of the FLIP-FLOP and to avoid possible oscillations. When FLIP-FLOP element 48 returns to its preferential side it applies a control signal to OR/NOR element 53 shifting its output to the OR side and thus removes one input signal to AND element 54. With only one input signal to element 54 there will be no output and therefore, a loss of signal to interface valve 26 will result. While this occurs, no change takes place in the mode of FLIP-FLOP element 49, whereby the signal to the memory elements 51 and 52 is not disturbed. Re-establishing the correct signal at fluidic sensor 10 will then generate a signal to interface valve 26.

A subsequent signal at signal port 11a will produce similar logic steps through elements 59, 61, 62, 63, 64, 66, 52 and 67. While interface valve 27 will receive a signal by way of AND element 63 the overriding quality of the memory circuit will cancel it out as well as the original signal to interface valve 26. This is accomplished by combining the two input signals to AND element 52 with the resulting output applying a signal to the control port of FLIP-FLOP element 56 switching its output from the preferential side. This immediately causes the loss of one input signal to both AND elements 54 and 63, by way of OR/NOR elements 57 and 68, thereby causing the loss of pilot signals to both interface valves 26 and 27. Simultaneously, the shift of FLIP-FLOP element 56 results in a direct pilot signal to interface valve 28 as well as a signal to the control port of OR/NOR element 69, thus shifting its output to the OR side.

When the fluid operated actuators 12 and 13 move the sensors 10 and 11, completely from the mold cavity 25, fluidic sensors 23 and 24 are triggered, thus resulting in signals which shift key elements 71 and 72, respectively, to their OR ports. These outputs are combined through AND element 73 and feed into AND element 74 by way of OR/NOR element 76. This input combines with the output of element 69 resulting in a direct signal to pressure switch 19.

The logic sequence described hereinabove is based on the assumption that the initial signal received resulted from actuation of sensor 10. It will be understood that a similar logic flow is produced if the original signal should result from actuation of sensor 11.

In the event it is desirable to operate with one cavity only, two manual operations are necessary. First, steam to the unused cavity must be cut off and second, either toggle valves 77 or 78 should be actuated. The toggle valve 77 or 78, as the case may be, merely puts a signal to the memory bank indicating that the unused cavity has satisfied its sensor and provides one of two required signals to AND element 52.

Figure 7:
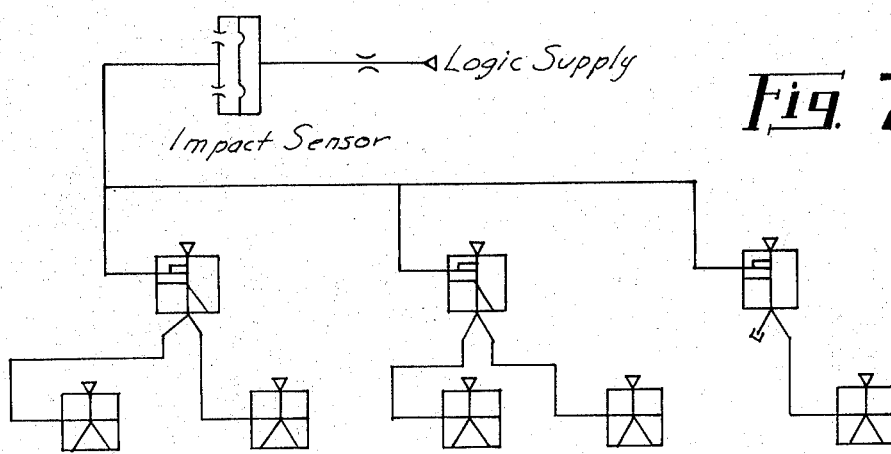

FIG. 7 merely shows a method of utilizing single function elements to replace the preferential FLIP-FLOP elements of FIG. 3. As mentioned above, anyone skilled in the art of fluidics could set up various schematics to accomplish the same logic.

FIG. 4 illustrates the pressure regulation means for the air supply to the logic elements, fluidic sensors 10, 11, 23 and 24 and the interface valves 26, 27 and 28. It also illustrates the schematic diagram for operatively connecting the toggle valves 77 and 78, the fluid sensors and the interface valves.

From the foregoing, it will be seen that I have devised an improved fluidic shaping detector for a tire mold which will eliminate rejects and seconds due to improper shaping. Also, my improved apparatus improves the quality of the tire as well as tire safety due to proper shaping. Furthermore, my improved apparatus results in a substantial savings both in material and labor due to increased bladder life. Furthermore, my improved apparatus effects a significant increase in production due to reduction in down time and sharply reduces maintenance costs relating to regulators and timers heretofore employed.

While I have shown my invention in several forms, it will be obvious to those skilled in the art that it is not so limited, but is susceptible of various other changes

What I claim is:

1. A shaping detector mechanism for a tire mold comprising at least one mold cavity having an inflatable bladder over which a green tire is placed, means supplying a shaping media to said bladder, a fluidic proximity sensor mounted for movement selectively to an outer position outwardly of the mold cavity and to an inner position located fixedly within said cavity so as to generate a signal only during the presence of an inflated bladder located in predetermined spaced relation from said sensor, a control valve for said means supplying shaping media to said bladder and movable selectively to a first position to supply shaping media and to a second position to interrupt the supply of shaping media, means to move said sensor to said inner position approximately at the time of introduction of final shaping media to said bladder, control means operatively connecting said sensor to said control valve to move said control valve immediately to said second position upon generation of said signal by said sensor to thus prevent both undershaping and overshaping of the tire, and means operatively connected to said sensor to move said sensor to said outer position upon generation of said signal by said sensor.

2. A shaping detector as defined in claim 1 in which position indicating means is provided to prevent closure of said mold until said sensor has moved to said outer position.

3. A shaping detector as defined in claim 2 in which said means to prevent closure of said mold until said sensor has moved to said outer position comprises a fluidic sensor mounted outward of said mold cavity.

4. A shaping detector as defined in claim 1 in which said control means operatively connecting said sensor to said control valve is a fluidic control system.

5. A shaping detector as defined in claim 1 in which a timer is energized in response to movement of said sensor to said inner position and is deenergized upon movement of said sensor to said outer position and said timer is operatively connected to a warning device which produces a signal in the event said sensor is not moved to said outer position within a predetermined time interval.

6. A shaping detector as defined in claim 1 in which said tire mold has at least two mold cavities with a bladder, a fluidic sensor and a control valve for each said mold cavity and actuating means is operatively connected to said means for moving the sensors to said outer position and operable only upon movement of both said control valves to said second position.

7. A shaping detector as defined in claim 6 in which means is provided to operate said detector selectively on all of the mold cavities of said mold and on a lesser member of mold cavities.

8. A shaping detector as defined in claim 1 in which said tire mold has at least two mold cavities and means is provided for storing the first signal received from a fluidic sensor in a memory bank and means is provided to send a subsequent signal received from at least one other fluidic sensor through the same memory bank to satisfy the conditions for movement of the fluidic sensors to said outer position.

9. A shaping detector mechanism for a tire mold comprising first and second mold cavities having respective inflatable bladders over which a green tire is placed, means supplying a shaping media to said bladders, first and second fluidic proximity sensors respectively mounted for movement relative to said first and second mold cavities and selectively between respective outer positions outwardly of said mold cavities and inner positions located fixedly within said mold cavities so as to generate respective first and second signals only during the presence of respective inflated bladders located in predetermined spaced relation from said first and second sensors, first and second valves controlling said means supplying shaping media to said bladders, said control valves each being movable selectively to a first position to supply shaping media and to a second position to interrupt the supply of shaping media, means for moving said sensors to said inner positions approximately at the time of introduction of final shaping media to said bladder, control means respectively operatively connecting said first and second sensors to said first and second control valves for respectively moving said control valves immediately to said second positions during respective generation of said signals by said sensors and for immediately and simultaneously moving said first and second sensors to said outer positions in response to initial generation of said signal by one of said sensors after the occurrence of the initial generation of said signal by the other of said sensors and regardless of whether said other sensor is still generating said signal.

* * * * *